United States Patent
Wall

(10) Patent No.: US 12,060,014 B2
(45) Date of Patent: Aug. 13, 2024

(54) MOVABLE MODULAR TRUCK TOOLBOX MOUNTING LIFT SYSTEM AND METHOD OF USE

(71) Applicant: Brandon Wall, Evans, GA (US)

(72) Inventor: Brandon Wall, Evans, GA (US)

( * ) Notice: Subject to any disclaimer, the term of this patent is extended or adjusted under 35 U.S.C. 154(b) by 0 days.

(21) Appl. No.: 17/963,480

(22) Filed: Oct. 11, 2022

(65) Prior Publication Data

US 2024/0116458 A1    Apr. 11, 2024

(51) Int. Cl.
*B60R 11/06*      (2006.01)
*B60P 1/48*       (2006.01)

(52) U.S. Cl.
CPC ........... *B60R 11/06* (2013.01); *B60P 1/483* (2013.01)

(58) Field of Classification Search
CPC . B60P 1/483; B60R 9/00; B60R 11/06; B60R 2011/0084; B60R 2011/0085
USPC ......... 414/546, 547, 679; 224/404; 296/37.6
See application file for complete search history.

(56) References Cited

U.S. PATENT DOCUMENTS

| | | | | |
|---|---|---|---|---|
| 3,276,610 | A * | 10/1966 | Thatcher | B60P 1/5428 414/546 |
| 3,468,439 | A * | 9/1969 | Olitsky et al. | B60P 1/5428 414/547 |
| 4,687,402 | A * | 8/1987 | Zatylny | A01D 87/127 414/547 |
| 5,037,153 | A * | 8/1991 | Stark | B60R 9/00 224/310 |
| 5,088,636 | A * | 2/1992 | Barajas | B60R 9/00 224/404 |
| 5,232,329 | A * | 8/1993 | Livingston | B60P 1/6454 414/500 |
| 6,412,847 | B2 * | 7/2002 | De Gaillard | B62D 33/0276 296/100.09 |
| 6,799,935 | B1 * | 10/2004 | Grollitsch | B60P 1/5428 414/469 |
| 6,935,670 | B2 * | 8/2005 | Bright | B60P 3/075 410/23 |
| 6,945,580 | B1 * | 9/2005 | Hentes | B60R 9/00 224/404 |

(Continued)

FOREIGN PATENT DOCUMENTS

| | | | | |
|---|---|---|---|---|
| EP | 0191683 A2 * | 8/1986 | | B60P 1/483 |
| JP | 56138035 A * | 10/1981 | | |
| WO | WO-2021248228 A1 * | 12/2021 | | B60P 1/483 |

*Primary Examiner* — James Keenan

(74) *Attorney, Agent, or Firm* — Richard Piercy; Grell & Watson Patent Attorneys

(57) ABSTRACT

A movable modular truck toolbox mounting lift system for lifting and repositioning a modular accessory (e.g., toolbox, container, cooler, platform) of a vehicle (e.g., truck, UTV) to enable access to the modular accessory without requiring an entry into the vehicle, a vehicle storage area, or a truck bed. The system has driver side and passenger side support plates pivotably connected to a pair of arms, which are in turn pivotably connected to each other to and upon movement (extension) of one arm pair, the modular assembly transits up and backward within the storage area. The system may be operated via actuators and/or motors to rotate the arms and lift/reposition the modular accessory. The modular accessory may be a toolbox, cabinetry toolbox, or a tray for receiving a plurality of modular accessories. A method of installing and using the system to lift and reposition a modular accessory in a vehicle.

16 Claims, 8 Drawing Sheets

(56) References Cited

U.S. PATENT DOCUMENTS

| | | | | |
|---|---|---|---|---|
| 7,128,356 | B2 * | 10/2006 | Bassett | B60R 11/06 296/37.6 |
| 8,776,778 | B1 * | 7/2014 | Brown | B60R 11/00 296/26.05 |
| 2006/0284437 | A1 * | 12/2006 | Collins | B60P 1/003 296/37.6 |
| 2007/0108786 | A1 * | 5/2007 | Martin | B60R 9/00 296/37.6 |
| 2014/0054339 | A1 * | 2/2014 | Smith | B60R 11/06 224/404 |
| 2016/0167591 | A1 * | 6/2016 | Salinas | B60R 9/06 224/404 |
| 2021/0038934 | A1 * | 2/2021 | Chang | B60P 1/4414 |

* cited by examiner

MOVABLE MODULAR TRUCK TOOLBOX MOUNTING LIFT SYSTEM AND METHOD OF USE

CROSS-REFERENCE TO RELATED APPLICATIONS

To the full extent permitted by law, the present United States Non-Provisional Patent Application hereby claims priority to and the full benefit of, United States Provisional Application entitled "LIFT A BOX," having assigned Ser. No. 63/254,124, filed on Oct. 10, 2021, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure relates generally to systems and methods for conveying a toolbox within a truck bed. Specifically, the disclosure relates to a movable modular lift system for a toolbox within a truck bed.

Description of the Related Art

Various accessories exist for the organization and conveyance of tools and other objects using a vehicle, namely, a truck bed. Straps, hooks, nets, compartments, and the like may offer the ability to securely convey such tools and other objects. More specifically, toolboxes which span the width of a truck bed are commonly manufactured. These toolboxes often are secured at various points to the truck bed, but are most commonly secured and/or stored toward the cabin (i.e., cab) of the truck using the bed floor or bed walls and an attachment means (e.g., bolts). By securing a toolbox to the bed, a person accessing the toolbox may have limited access to the tools therein for various reasons. For example, many modern trucks, and their corresponding beds are taller than many individuals may be able to easily access from the side of the truck, especially for tools and/or objects stored toward the center of the box. This may require those accessing the toolbox to climb into the truck bed in order to access such materials. A frequent problem with climbing into a truck bed may be that other objects may be stored within the bed. In such a case, those needing access to the tools stored therein the toolbox may need to unload other tools, heavy equipment, or payloads before being able to access tools stored centrally within the toolbox.

Additionally, the most commonly available toolboxes for trucks offer little in the way of organizational storage. They typically feature a swinging lid for protection from the elements, a lock to deter and/or prevent theft of contents, and a large void within, which may be compartmentalized and/or customized. However, many lack certain functional organizational elements, such as cabinet doors having shelving therein, drawers, the like and/or combinations thereof. Many times this may be due to the issues discussed above related to other objects which may be stored, and therefore obstruct such functional organizational elements and/or access thereto.

Many attempts have been made to address these inconveniences related to toolboxes and trucks. One example includes movable toolboxes, which may slide via a lip of the toolbox along the side rail of the bed, from the cab side of the bed to the tailgate side of the bed. Other examples may include locking casters to roll a toolbox along the length of the bed. Yet other examples are larger toolboxes which extend the length of the truck bed, but may not consume the entire bed height, and may feature drawers that can be pulled out proximate the tailgate. Each of these attempts to solve the problems discussed above, however have shortfalls. Those which allow the toolbox to roll and/or slide may retain the disadvantage of requiring the payload being removed for the truck in order to effectuate the conveyance of the toolbox. Those which span the length of the bed often consume significant bed "real estate" and may prevent the conveyance using the truck of various objects and/or tools needed for various jobs. Another deficiency of prior attempts to create a movable toolbox for trucks may be the wheel arch obstructions commonly found in the bed boxes of many and even most available pickup trucks. Due to such obstructions, special configurations of a toolbox designed to be conveyed from a cab side of a bed to a tailgate side of a bed must generally be used. These special configurations are either shallower throughout the toolbox width, to avoid the obstruction, or contoured to avoid the wheel arch obstructions. Such configurations sacrifice precious space within the toolbox to achieve the intended result.

Therefore, it is readily apparent that there is a recognized unmet need for a movable modular truck toolbox mounting lift system and method of use which can be adapted for various uses and/or organizational configurations while enabling access thereof without consuming bed surface area and requiring the need for payload removal. The instant disclosure is designed to address this need through a system and methods of use, which includes a movable modular truck toolbox mounting lift system and method of use disclosed herein while addressing at least some of the aspects of the problems discussed above.

SUMMARY

Briefly described, in a possibly preferred embodiment, the present disclosure overcomes the above-mentioned disadvantages and meets the recognized need for such a movable modular truck toolbox mounting lift system and method of use by providing a system having mechanisms for the lifting, swinging, and placement of a modular toolbox system from a first position to a second position, thereby enabling a user of the system and method to have easier and more convenient access to the tools, equipment, and other objects therein, without the necessity to climb into the truck bed and/or remove an obstructing payload from the bed. Various embodiments of the disclosure may have specific arrangements, machines, parts, mounts, the like and/or combinations thereof in order to achieve the intended results as recited herein. Though these specifics may be described to a level of specificity in order to enable those having ordinary skill in the art to practice the disclosed system and method, the disclosure is not so limited to the specific embodiments disclosed herein.

More specifically, the example embodiments of the present movable modular truck toolbox mounting lift system and method of use may include a first pair of mounts to secure a first pair of arms to a truck bed and a second pair of mounts to secure a second pair of hydraulic arms or other machine-extending arms. Each arm pair may be understood to be a driver side arm and a passenger side arm. These arms may be positioned in an arrangement such that the first pair is secured, via the first mounting bracket pair, on, at, near, or proximate the wheel well indentation of the truck bed. Further, these arms may be positioned in an arrangement such that the second pair is secured, via the second mounting bracket pair, near or proximate the cab of the truck, within the bed. In a perhaps preferable embodiment of the disclosure, each pair of arms may be secured to their corresponding mounting pair via a pivoting connection, such as a hinge or ball-and-socket connection, to enable the arm movement as disclosed herein. This connection on each of each pair of arms may reside at a first end of each corresponding arm, meaning that a first driver side arm may connect to a mounting bracket near/at/proximate the driver side wheel well indentation at its first end, the first passenger side arm may connect to a mounting bracket near/at/proximate the passenger side wheel well indentation at its first end, the second driver side arm may connect to a mounting bracket near/at/proximate the cab driver side corner of the truck bed, and the second passenger side arm may connect to a mounting bracket near/at/proximate the cab passenger side corner of the truck bed. For the first pair, at an opposite end (i.e., second end) of the mounting end connection (i.e., first end), a connection may exist to a point on the modular toolbox system of the disclosure. Each second end may connect to the modular toolbox system of the disclosure via a similar pivoting connection such as a hinge or ball-and-socket connection. The second pair, at an opposite end (i.e., second end) of the mounting connection (i.e., first end, a connection may exist to a point therebetween the first end and second end of the first arm for each corresponding side. Again, a movable connection may be provided by, for example, a hinge, pivot connection, ball-and-socket joint, the like and/or combinations thereof. The second arm, which extends from a first connection end at a mount at/near/proximate a bed corner proximate the cab to the point along the first arm may extend and contract via a machine system, such as a hydraulic arm having actuator power and control. Since each arm may pivot about its connection to its mount, extending and contracting the second arm on the passenger and driver side simultaneously (and at the same rate), may lift the modular toolbox system of the disclosure and swing the tool box during extension and retraction to and from the cab to the tailgate, respectively, enabling the user to obtain easier access to the contents therein and having the further benefit of not needing to remove a payload therebetween the cab and the tailgate. Other benefits, features, capabilities, arrangements, and embodiments are further outlined herein and described in detail below in the Detailed Description and illustrated in the Drawings.

In an exemplary embodiment, the modular toolbox may be of the standard variety found as standard (i.e., OEM) and/or aftermarket equipment in passenger, commercial, and industrial automotive trucks, commonly referred to as pickup trucks. Such a toolbox may feature a top hinged cover or opening for access, a container which resides within the confines of the cab-side of the truck bed, and an upper portion of the container which may feature a lip that overlaps the side rails or side portion of the bed. In other embodiments, improvements to the standard and/or commonly purchased toolbox are disclosed which may include a modular toolbox receiving system capable of receiving a variety of form factors having a plurality of features. The plurality of features may include locks, handles, organizational compartments, organizational cabinets, organizational shelving, organizational drawers, organizational trays, parts and features corresponding thereto, the like and/or combinations thereof.

In select embodiments, the modular toolbox system of the disclosure may operate via an actuator connected to or forming a part of one pair or more arms. The pivotable connection therebetween each arm pair, along with the pivotable connection to the modular accessory and the brackets, along with the actuation of one pair or more arms may lift the modular accessory, while maintaining stability thereof, and transit the modular accessory over a payload and from a cab side of a vehicle storage area and a tailgate side of a vehicle storage area.

In other select embodiments, various lengths of the first arm pair and the second arm pair may offer varying positions and features. In a specific embodiment, each arm pair may operate separately or simultaneously to provide additional lifting potential, thereby accommodating larger payloads.

In yet other select embodiments, the mechanical systems of the present movable modular truck toolbox mounting lift system and method of use may be built and/or adapted for a modular tray capable of receiving various compartments, tools, accessories, the like and/or combinations thereof. Additional improvements may include the ability to control the actuators of the movable modular truck toolbox mounting lift system via a vehicle key (i.e., remote FOB), a switch/control installed within the vehicle or the vehicle storage compartment, or a switch/control on the movable modular truck toolbox mounting lift system or on the modular accessory thereof.

These and other features of the movable modular truck toolbox mounting lift system and method of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The movable modular truck toolbox mounting lift system and method of use will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-8, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It should be noted that the terms vehicle(s) and/or truck(s) may be used herein interchangeably as descriptors for any motorized means of transportation which include a bed, chamber, or compartment for the conveyance of objects and/or passengers. The various parts of interest of a general passenger truck may be illustrated throughout FIGS. 1-6, namely bed cab end C, bed tailgate end T, bed passenger rail P, bed driver rail D, bed box B, and wheel arch W (or driver wheel arch W1 and passenger wheel arch W2), which are provided to enable those having ordinary skill in the art to better understand the features, objects, and mechanics of the disclosure. The disclosure is not limited to specific configuration of the truck or truck components as herein illustrated. The term toolbox, as used herein, shall mean any organizational compartment and/or series of compartments. While several variations of toolboxes are illustrated herein, such as drawer compartment toolbox 900, cabinet toolbox 901, divided toolbox 902, and handle toolbox 903, the description is not so limited to these specific configurations or systems, except as claimed herein.

Figure 1:
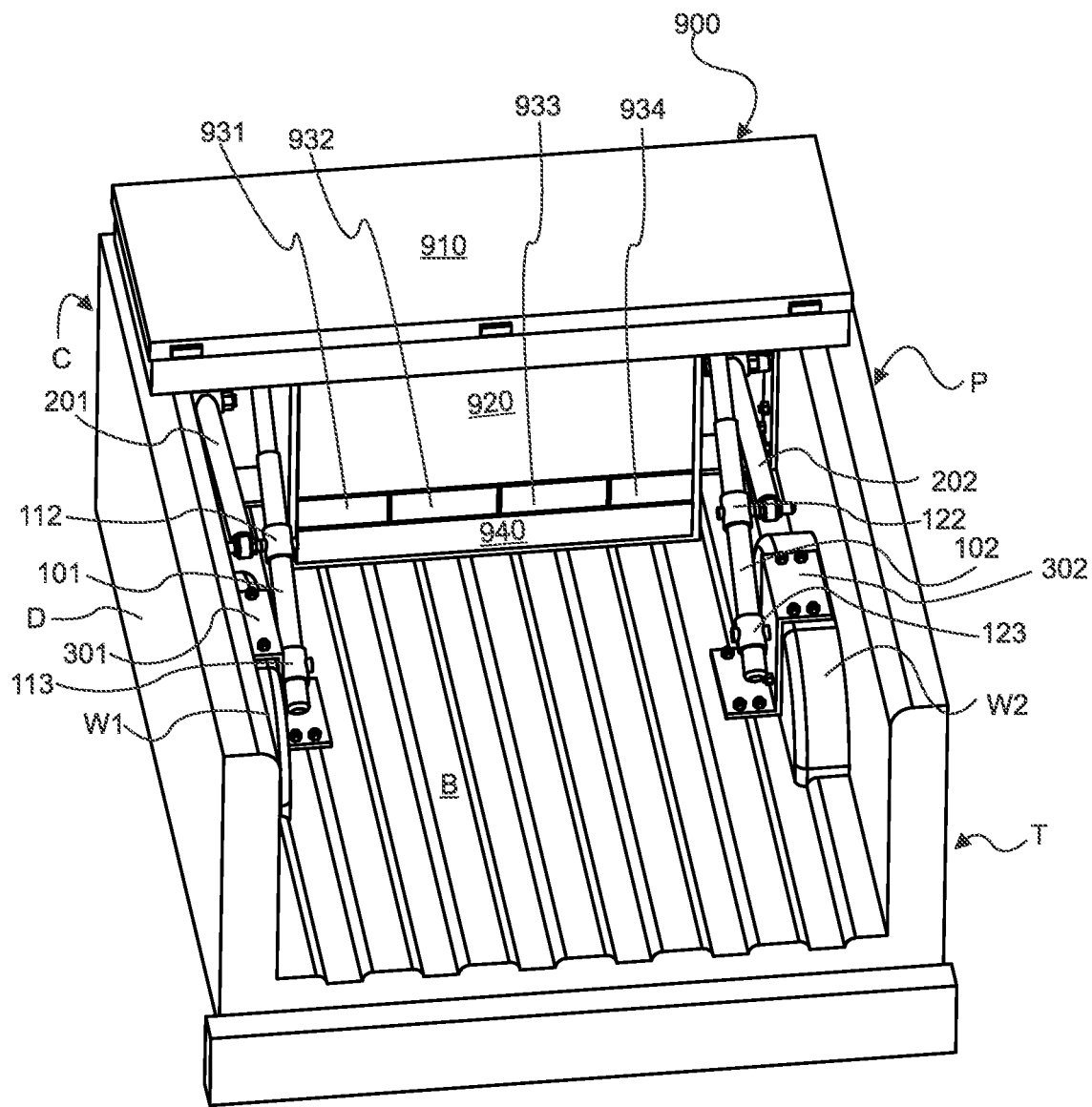
FIG. 1 is a perspective drawing of truck bed having an exemplary embodiment of the movable modular truck toolbox mounting lift system installed therein in a first position.

Referring now to FIG. 1 by way of example, and not limitation, therein is illustrated an example embodiment of the movable modular truck toolbox mounting lift system of the disclosure in a first position. The movable modular truck toolbox mounting lift system may be featured within the confines of a truck bed having bed cab end C, bed driver rail D, bed passenger rail P, bed tailgate end T, and tailgate G (not shown). As illustrated, the first position may be understood by those having ordinary skill in the art as the position when compartment toolbox 900 resides at, proximate and/or near bed cab end C, and may further be understood by those having ordinary skill in the art as the position most suitable for driving and/or storage. In fact, fixed toolboxes may be generally understood by those having ordinary skill in the art as being properly installed and/or commonly installed in the area where compartment toolbox 900 is illustrated herein FIG. 1. As illustrated in FIG. 1, the exemplary movable modular truck toolbox mounting lift system may feature compartment toolbox 900 having a series of features which may be helpful to the organization of compartment toolbox 900. Starting at toolbox lid 910, such toolbox lid 910 may feature a hinge (or hinges) at one side, such that it may be opened, and latches (toolbox latches 911, 912, 913) at an opposite side, which may latch, secure, and/or lock toolbox lid 910. Beneath toolbox lid 910 may be simply a void to store tools, equipment and/or other objects, or may be an organizational structure and/or compartments for further organizations. Compartment toolbox 900 may further feature compartment toolbox cabinet(s) 920 which may open by a hinge at one side, may open from the center with hinges at opposite sides, and/or may swing open via a hinge at the top or bottom of compartment toolbox cabinet(s) 920. Within may be simply a void to store tools, equipment and/or other objects, may be an organizational structure and/or compartments for further organizations, or may feature shelving and/or drawers. Further features of compartment toolbox cabinet(s) 920 may include latches, locks, handles, knobs, the like and/or combinations thereof. Below compartment toolbox cabinet(s) 920 may be compartment toolbox drawers 931, 932, 933, 934. In this exemplary form, compartment toolbox drawers 931, 932, 933, 934 may be shallow such that the contents therein may be readily visible upon opening. As understood by those having ordinary skill in the art, other drawer combinations may be suitable and the disclosure is not so limited to those illustrated herein. Finally, beneath compartment toolbox drawers 931, 932, 933, 934 may be compartment toolbox tray 940, which may similarly pull out from compartment toolbox 900 and provide a shallow compartment having a surface for storage of equipment, which remains readily visible when opening. The components of compartment toolbox drawers 931, 932, 933, 934 and compartment toolbox tray 940 may also feature latches, locks, handles, knobs, internal organizational compartments/features, the like and/or combinations thereof.

Turning to the movable assembly features of the movable modular truck toolbox mounting lift system of the disclosure in a first position as illustrated therein FIG. 1, various components are illustrated therein. Importantly, these parts and the assembly are chiral (handed) in nature, and feature driver and passenger side counterparts which may be moved in combination to achieve the results as specified herein. For secure and stable installation, driver side central bracket 301 may span a portion of bed box B and driver wheel arch W1. Opposite driver side central bracket 301 may be passenger side central bracket 302 which may similarly a portion of span bed box B and passenger wheel arch W2. Each of driver side central bracket 301 and passenger side central bracket 302 may be optimally secured to bed box B and driver wheel arches W1, W2, respectively, through use of screws and/or bolts which may penetrate through body and/or bedliner component(s) thereof. As understood by those having ordinary skill in the art, such bolts may be of various lengths and/or thicknesses/strengths and may further feature the components of nuts, washers, locking nuts, the like and/or combinations thereof. Additional methods, systems, and means of manufacture are contemplated herein for the attachment of driver side central bracket 301 and passenger side central bracket 302 to a truck, which may include but are not limited to adhesive, weld bonding, latching, bedliner integration, the like and/or combinations thereof. While various materials may be suitable for the construction of driver side central bracket 301 and passenger side central bracket 302, given the nature of the movable modular truck toolbox mounting lift system and the strength required to secure it thereto a truck, strong materials may be most suitable, including hardened steel alloys, stainless steel, aluminum, strong plastics, wood and other natural materials, the like and/or combinations thereof, as well as other suitable materials known to those having ordinary skill in the art. While a material, length, width, height, thickness, and overall shape of driver side central bracket 301 and passenger side central bracket 302 are contemplated and illustrated herein, the disclosure is not so limited to a thick, steel plate bent to span horizontally across a limited portion of bed box B, bend upward vertically upon driver wheel arch W1 and passenger wheel arch W2, respectively, and bending again horizontally over the top of driver wheel arch W1 and passenger wheel arch W2, respectively, and being secured thereto via a series of bolts penetrating bed box B and driver wheel arch W1 and passenger wheel arch W2, respectively. Turning to driver side fixed length arm 101 and passenger side fixed length arm 102, each may feature driver side central bed pivot 113 and passenger side central bed pivot 123 which may be a pivotable connection to driver side central bracket 301 and passenger side central bracket 302, respectively. Importantly, the pivotable connections thereto driver side central bracket 301 and passenger side central bracket 302 may pivot and remain parallel to the direction of bed driver rail D and bed passenger rail P, respectively, and may pivot across a wide angular distance (i.e., up to 180°), but in function may only require a limited angular distance to achieve the intended results of movement of compartment toolbox 900 from a first position to a second and third position (see FIGS. 5A-C). Driver side fixed length arm 101 and passenger side fixed length arm 102 may further feature driver pivotable toolbox attachment point 119 and passenger pivotable toolbox attachment point 129 (neither shown, see e.g., FIG. 2), which may also pivotably connect to compartment toolbox 900 during movement of the movable modular truck toolbox mounting lift system. Finally, the movable modular truck toolbox mounting lift system may feature driver side extending/retracting arm 201 and passenger side extending/retracting arm 202, which may each pivotably connect to the truck at driver pivotable toolbox attachment point 119 (and the unillustrated chiral counterpart on the passenger side, or passenger pivotable toolbox attachment point 129) at driver side cab bracket 303 (and the unillustrated chiral counterpart on the passenger side). Driver side extending/retracting arm 201 and passenger side extending/retracting arm 202 may then pivotably connect to driver side fixed length arm 101 and passenger side fixed length arm 102, respectively, at driver side arm pivot 112 and passenger side arm pivot 122, respectively, such that during movement of the movable modular truck toolbox mounting lift system, via simultaneous extension and/or retraction of driver side extending/retracting arm 201 and passenger side extending/retracting arm 202, each pivoting connection may allow for the free movement and enables the lifting and conveyance of compartment toolbox 900. Many potential means of movement may enable the extension and retracting of driver side extending/retracting arm 201 and passenger side extending/retracting arm 202, including hydraulic means, which may be activated and/or powered via an actuator. Significant power and strength may be required, depending on the weight of the movable modular truck toolbox mounting lift system, compartment toolbox 900, and the contents therein. Though several mechanisms for driver side extending/retracting arm 201 and passenger side extending/retracting arm 202 are contemplated, illustrated and/or described herein, the disclosure is not limited to such mechanisms and may include any mechanism capable of extending and contracting an arm as illustrated herein. Furthermore, activation, actuation, power supply, and control of driver side extending/retracting arm 201 and passenger side extending/retracting arm 202 may be accomplished by any means known to those having ordinary skill in the art.

Figure 2:
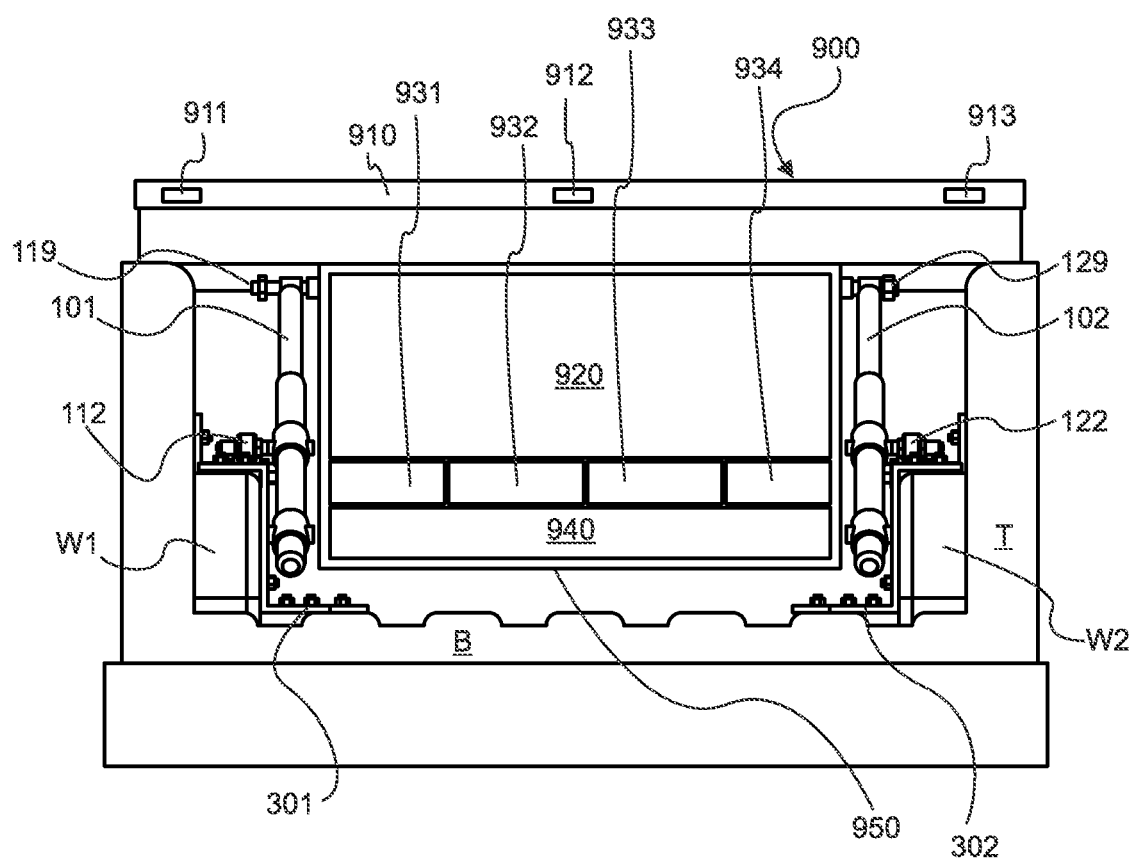
FIG. 2 is a rear elevation drawing thereof.

Referring now to FIG. 2, illustrated therein is the exemplary embodiment of the movable modular truck toolbox mounting lift system in the first position (same as FIG. 1), but from a rear elevation view, the viewer oriented toward the rear of an exemplary truck and its bed, to show various features otherwise concealed in the perspective view found in FIG. 1. The movable modular truck toolbox mounting lift system may be featured within the confines of a truck bed, bed box B and bed tailgate end T being most prominently featured at this view. As illustrated, the first position may be understood by those having ordinary skill in the art as the position when compartment toolbox 900 resides at, proximate and/or near bed cab end C, and may further be understood by those having ordinary skill in the art as the position most suitable for driving and/or storage. As described in greater detail above, compartment toolbox 900 may feature toolbox latches 911, 912, 913 as well as compartment toolbox cabinet(s) 920, compartment toolbox drawers 931, 932, 933, 934, and compartment toolbox tray 940, though other arrangements and/or configurations may be further relevant to the disclosure. In this view, an exemplary shape and structure of driver side central bracket 301 and passenger side central bracket 302 may be better understood by those having ordinary skill in the art. Such a configuration may be important to the overall strength and stability of the movable modular truck toolbox mounting lift system. As illustrated, a series of bolts may connect driver side central bracket 301 and passenger side central bracket 302 to driver wheel arch W1 and passenger wheel arch W2, respectively, as well as bed box B. While the shape, configuration, size, etc. of commonly available pickup truck may vary, reconfiguration to ensure adaptation to these variations should be easily understood by those having ordinary skill in the art, and may be made according to such variation to accommodate the movable modular truck toolbox mounting lift system and the corresponding driver side central bracket 301 and passenger side central bracket 302, as they may relate to any particular bed box B, driver wheel arch W1, or passenger wheel arch W2. As described in greater detail above, the movable modular truck toolbox mounting lift system may feature a first and second pair of arms, one pair which may be fixed in length and one pair which may articulate in length by extending and retracting. As illustrated herein FIG. 2, only the fixed length pair may be visible when viewing the truck from the rear. Those fixed length arms, which are driver side fixed length arm 101 and passenger side fixed length arm 102, may be pivotably attached to each of driver side central bracket 301 or passenger side central bracket 302, respectively, at driver side central bed pivot 113 and passenger side central bed pivot 123, respectively. This may allow driver side fixed length arm 101 and passenger side fixed length arm 102 to rotate about and/or proximate driver side central bracket 301 and passenger side central bracket 302, respectively, during the mechanical movement of driver side extending/retracting arm 201 and passenger side extending/retracting arm 202. Driver side fixed length arm 101 and passenger side fixed length arm 102 may attach further to compartment toolbox 900 at each respective side, and such attachment may further be pivotable, such that compartment toolbox 900 may remain substantially horizontal during such mechanical movement. Having yet another pivotable attachment, namely, to driver side extending/retracting arm 201 and passenger side extending/retracting arm 202 therebetween the first two attachments, the pair of fixed length arms may be pushed and pulled from/to bed cab end C and bed tailgate end T. This in turn may cause compartment toolbox 900 to transit from bed cab end C to bed tailgate end T during extension of driver side extending/retracting arm 201 and passenger side extending/retracting arm 202, respectively. Further exemplary positions during the mechanical movement of the movable modular truck toolbox mounting lift system, and the benefits thereof, may be further evident to those having ordinary skill in the art upon review of the remaining Drawings and Detailed Description, namely, FIGS. 3-5.

Figure 3:
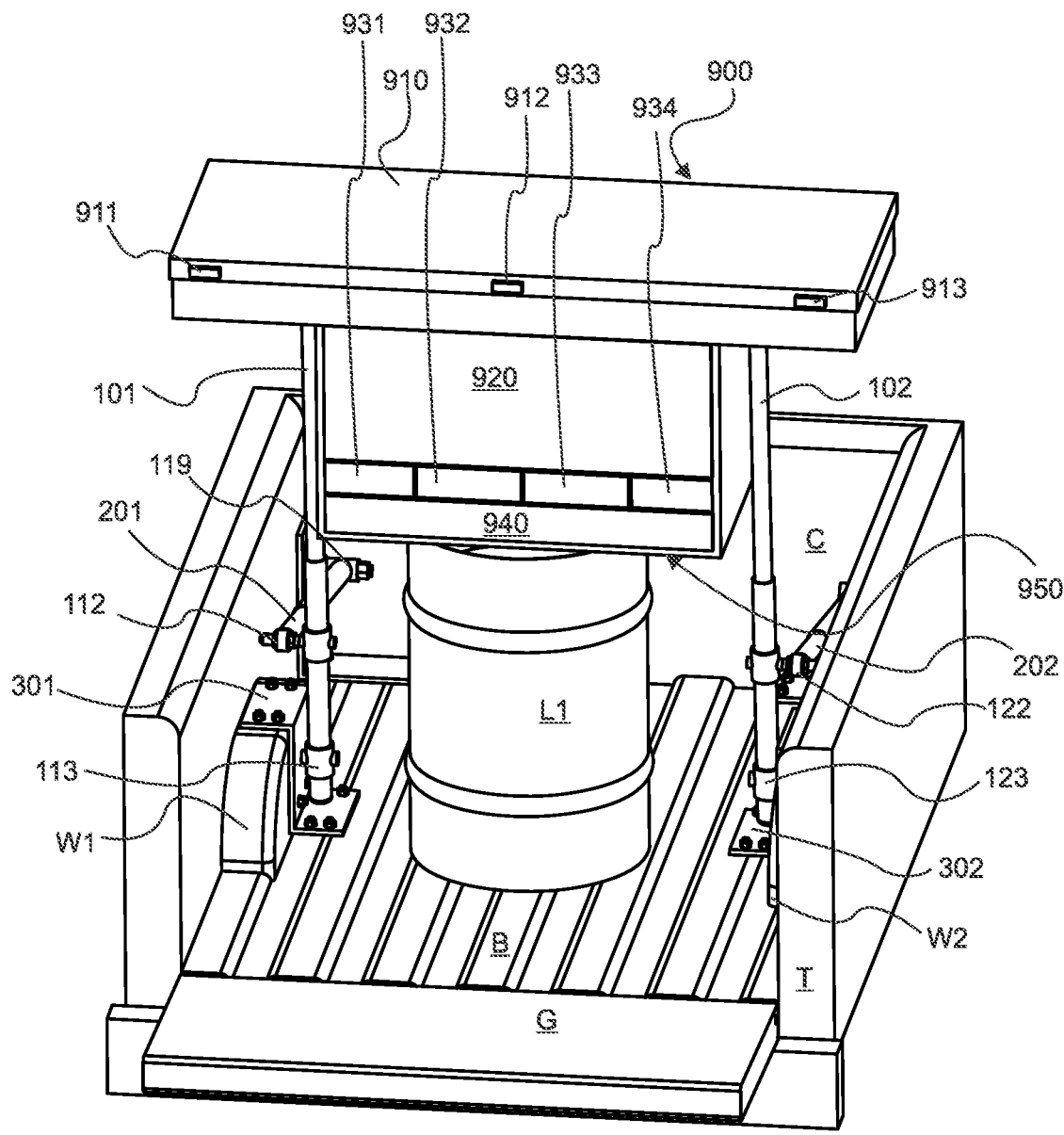
FIG. 3 is another perspective view thereof, showing a second position and a first exemplary payload.

Referring now to FIG. 3, illustrated therein is another perspective view thereof the movable modular truck toolbox mounting lift system, showing a second position and first exemplary payload L1. Again, features of a commonly available and used truck having a truck bed are illustrated to provide the appropriate context relevant to those having ordinary skill in the art. Those may be bed box B, bed tailgate end T, bed cab end C, bed driver rail D, driver wheel arch W1, passenger wheel arch W2, and bed passenger rail P. Additionally, tailgate G is illustrated therein FIG. 3 to provide additional context and visual support for the Drawings. Other components of the disclosure, namely, compartment toolbox 900, are also illustrated therein FIG. 3, but described in greater detail above. Those are toolbox lid 910, toolbox latches 911, 912, 913, compartment toolbox cabinet(s) 920, compartment toolbox drawers 931, 932, 933, 934, and compartment toolbox tray 940. While these aspects may form important features of the disclosure, in that they may be increasingly useful when compartment toolbox 900 can be reposition as described herein, the payload location maintenance may be the highlighted feature shown therein FIG. 3. Finally, though one payload is illustrated therein FIG. 3, namely, first exemplary payload L1, the disclosure is not so limited, and those having ordinary skill in the art may understand that any known payload which may fit within the confines of a truck bed may be relevant to the disclosure. Turning to the mechanical and structural aspects of the movable modular truck toolbox mounting lift system illustrated therein FIG. 3, each of driver side fixed length arm 101 and passenger side fixed length arm 102 may be pivotably attached to driver side central bracket 301 and passenger side central bracket 302, respectively. As described in greater detail above, each of driver side central bracket 301 and passenger side central bracket 302 may be secured to driver wheel arch W1/passenger wheel arch W2 and bed box B. Perhaps importantly, as illustrated driver side fixed length arm 101 and passenger side fixed length arm 102 may actually not be fixed in length. It is contemplated herein and illustrated herein FIG. 3 that these arms may additionally be extended and contracted in synchronization in order to enable the lifting over tall objects, such as first exemplary payload L1, which may be a large drum containing a liquid. In such an alternative embodiment, extension may occur between driver side arm pivot 112 (and passenger side arm pivot 122) and driver pivotable toolbox attachment point 119 (and passenger pivotable toolbox attachment point 129), such that the simultaneous extension of driver side extending/retracting arm 201 and passenger side extending/retracting arm 202 does not counteract/interfere with the extension/retraction of driver side fixed length arm 101 and passenger side fixed length arm 102. Such a feature may be especially useful for drivers requiring payloads of relatively large heights, and may further enhance the utility of the movable modular truck toolbox mounting lift system disclosed herein.

Figure 4:
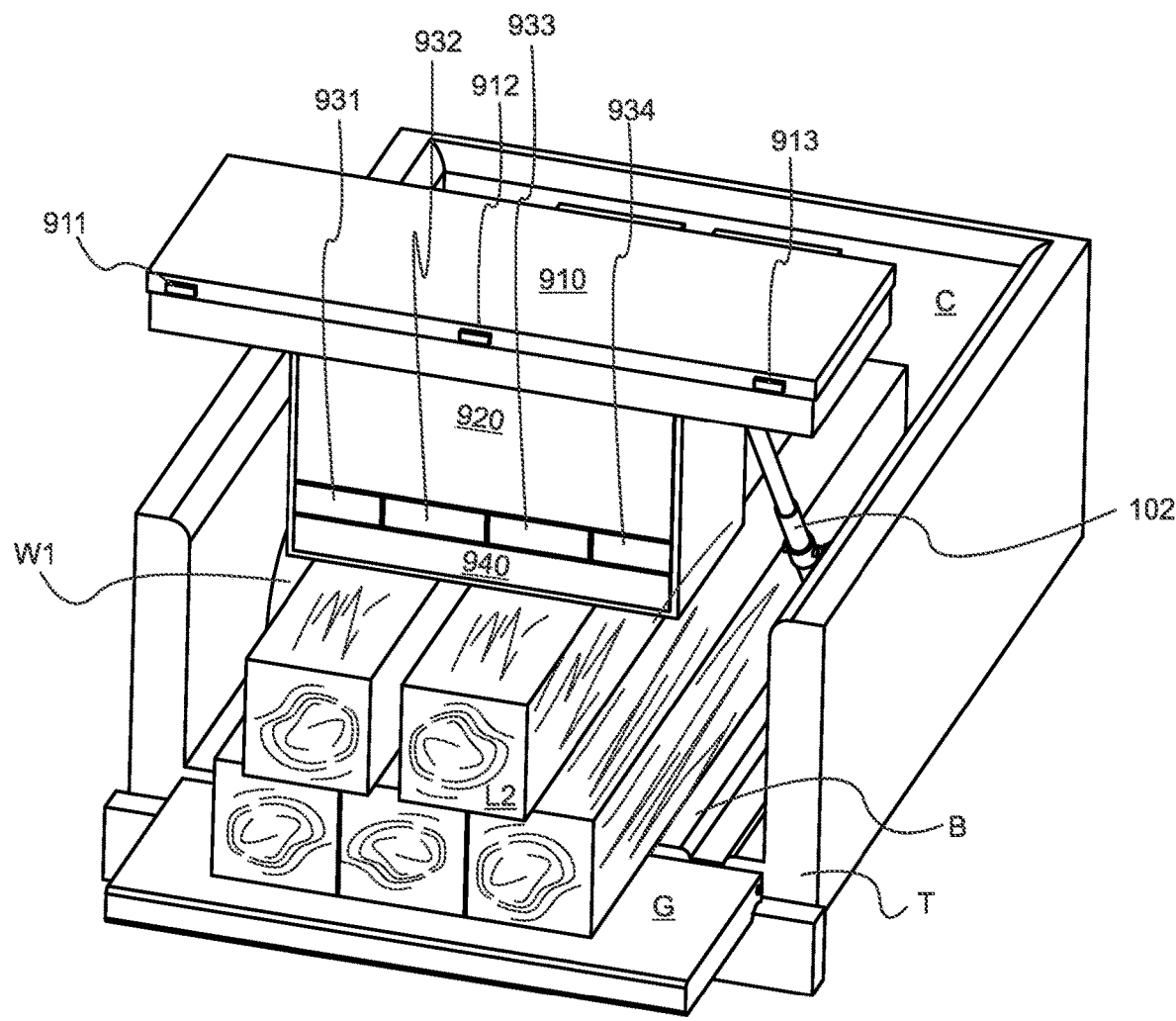
FIG. 4 is yet another perspective view thereof, showing a third position and a second exemplary payload.
Figure 5:
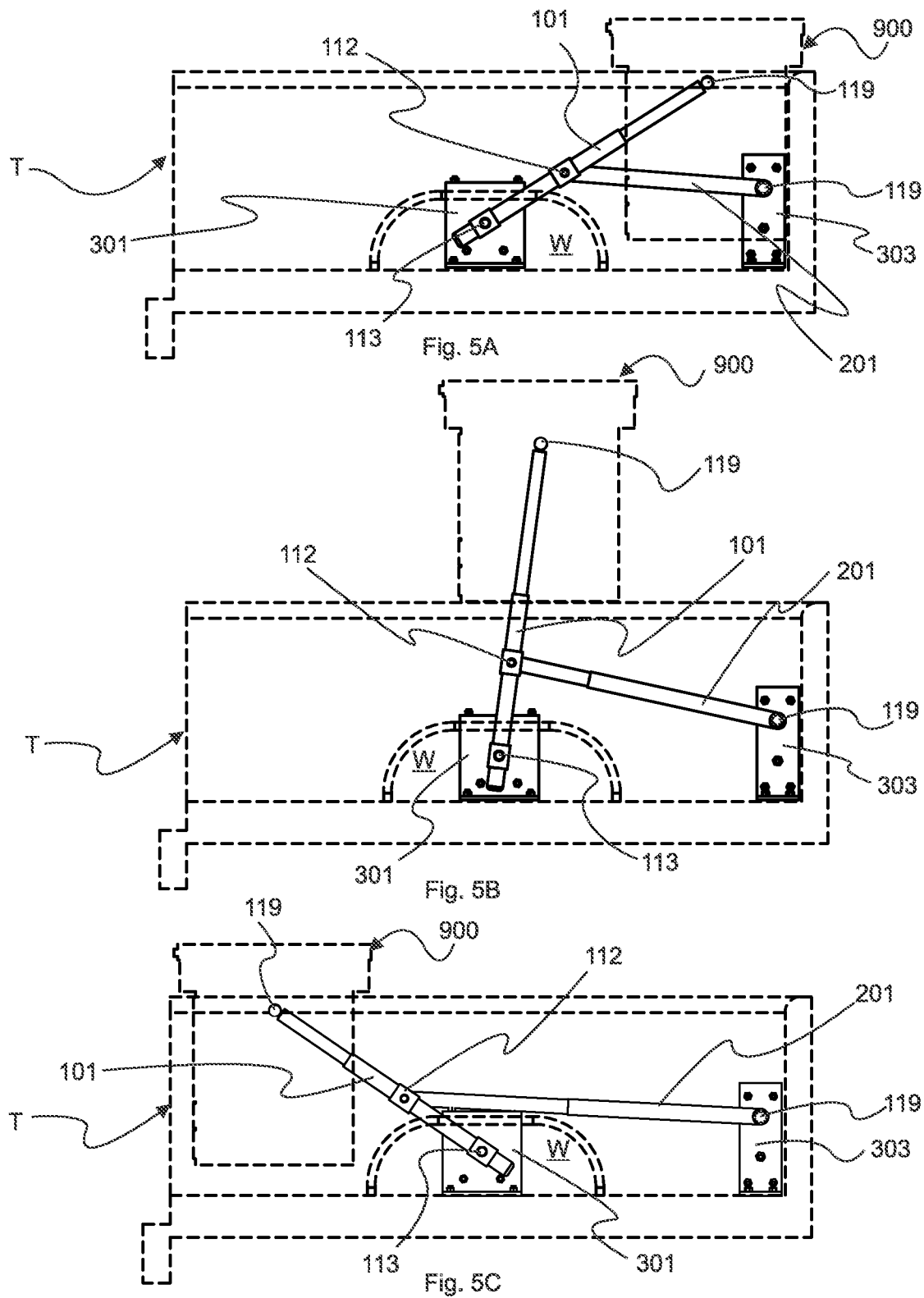
FIG. 5A is a side cutaway elevation drawing thereof, showing the movable modular truck toolbox mounting lift system in the first position.
FIG. 5B is a side cutaway elevation drawing thereof, showing the movable modular truck toolbox mounting lift system in the second position.
FIG. 5C is a side cutaway elevation drawing thereof, showing movable modular truck toolbox mounting lift system in the third position.

Now, referring to FIG. 4, illustrated therein is yet another perspective view of the movable modular truck toolbox mounting lift system showing a third position and second exemplary payload L2. Yet again, features of a commonly available and used truck having a truck bed are illustrated to provide the appropriate context relevant to those having ordinary skill in the art. Those may include bed box B, bed tailgate end T, bed cab end C, bed driver rail D, driver wheel arch W1, passenger wheel arch W2, and bed passenger rail P. Additionally, tailgate G is illustrated therein FIG. 4 to provide additional context and visual support for the Drawings. Other components of the disclosure, namely, compartment toolbox 900, are also illustrated therein FIG. 4, but described in greater detail above. Those are toolbox lid 910, toolbox latches 911, 912, 913, compartment toolbox cabinet(s) 920, compartment toolbox drawers 931, 932, 933, 934, and compartment toolbox tray 940. While these aspects may form important features of the disclosure, in that they may be increasingly useful when compartment toolbox 900 can be reposition as described herein, the payload location maintenance and type may be the highlighted feature shown herein FIG. 4. Finally, though one payload is illustrated therein FIG. 4, namely, second exemplary payload L2, the disclosure is not so limited, and those having ordinary skill in the art may understand that any known payload which may fit within the confines of a truck bed may be relevant to the disclosure. As therein illustrated in FIG. 4, second exemplary payload L2 may be a series of large posts and/or lumber. By orienting compartment toolbox 900 upon second exemplary payload L2, using the mechanical features, parts, and aspects described above, a payload, such as second exemplary payload L2, may be pinched upon bed box B and/or tailgate G, such that second exemplary payload L2 may be better and/or more conveniently secured during transit of the vehicle. The downward force provided by compartment toolbox 900 upon second exemplary payload L2 may form an important aspect of the disclosure, such that it may be lifted during the loading and/or unloading of second exemplary payload L2, but may be placed upon second exemplary payload L2 subsequent to loading, and during conveyance of the vehicle and second exemplary payload L2. Additional features of compartment toolbox 900 for such uses may include warning signs, warning lights, retracting flags, etc., such that other drivers may be warned of an overloaded truck payload, and take the corresponding caution upon approach. Such features may be manual or automatic, and such lighting features of compartment toolbox 900 may be flashing, may persist, or may be wired to a vehicle break, as understood by those having ordinary skill in the art.

Referring to FIGS. 5A-C in combination, therein illustrated are side elevation views of the movable modular truck toolbox mounting lift system showing the driver side features in the first, second, and third positions. Features of the vehicle and some features of the movable modular truck toolbox mounting lift system, including wheel arch W, bed tailgate end T, bed cab end C, bed box B, and compartment toolbox 900 may be drawn transparently (dashed lines) or omitted therein FIGS. 5A-C in order to better illustrate those features of the movable modular truck toolbox mounting lift system during the mechanical conveyance of compartment toolbox 900. Finally, in order to better illustrate these features from the side elevation view found in FIGS. 5A-C, only the driver side features of the movable modular truck toolbox mounting lift system are illustrated and described herein. As described above, such driver and passenger side aspects, parts, and features may be chiral, such that their corresponding counterpart may act in synchronization and/or combination to achieve the exemplary results. Starting at FIG. 5A, compartment toolbox 900 may be in the down and forward position, nearest bed cab end C. Such position may be most relevant to how drivers may prefer to place compartment toolbox 900 during normal use. FIG. 5C may illustrate compartment toolbox 900 in a down and rear position, which may be most relevant to a convenient placement for access to compartment toolbox 900. As illustrated therein FIGS. 5A and 5C, each of the down positions may rest a lip portion of compartment toolbox 900 upon bed driver rail D and/or bed passenger rail P for the additional strength and stability such rails may provide. Additionally, force stress upon the movable modular truck toolbox mounting lift system may be relieved by such reliance on the rails. FIG. 5B may illustrate compartment toolbox 900 in its highest position, which may only occur momentarily between the positions illustrated in FIGS. 5A and 5C. As illustrated in FIGS. 3-4, such height achieved through movement of the mechanical features of movable modular truck toolbox mounting lift system may be important to overcome obstructions, such as payloads, as illustrated in FIGS. 3-4 and described above. Turning to how movement may be achieved as those having ordinary skill in the art observe changes between FIGS. 5A-C, driver side extending/retracting arm 201 (and its unillustrated counterpart) may begin in a fully contracted (i.e., shortest) position. Then, in FIG. 5B, driver side extending/retracting arm 201 (and its unillustrated counterpart) may extend some, which may cause driver side fixed length arm 101 to pivot about driver wheel arch W1 via driver side central bed pivot 113. Further pivoting, compartment toolbox 900 may remain substantially upright/horizontal by pivoting about driver pivotable toolbox attachment point 119. Finally, driver pivotable toolbox attachment point 119 may extend again (or continue to extend in one fluid motion) in order to place compartment toolbox 900 upon each of bed driver rail D and bed passenger rail P, proximate bed tailgate end T, to provide the intended convenient access to the contents thereto compartment toolbox 900.

Figure 6:
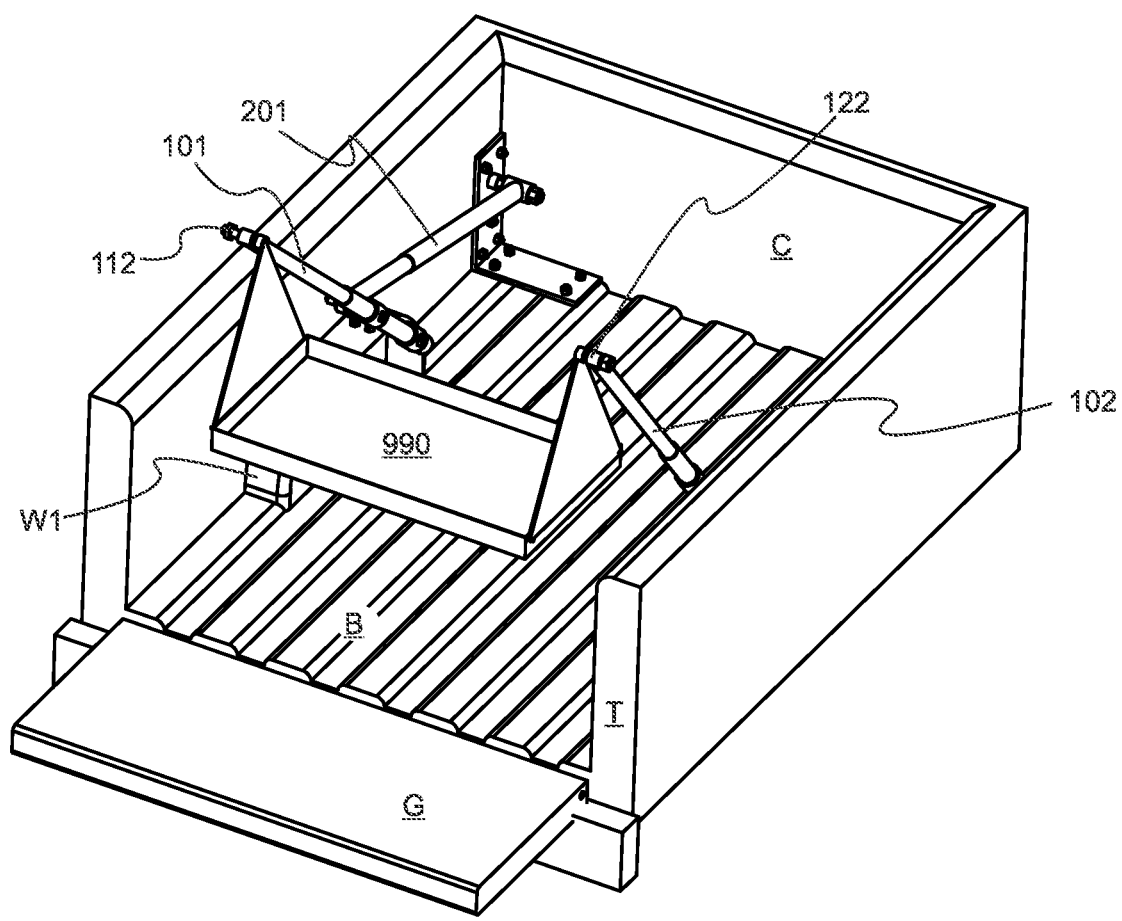
FIG. 6 is a perspective drawing of the truck having an alternate embodiment of the movable modular truck toolbox mounting lift system.

Referring to FIG. 6, illustrated therein is yet another perspective view of the movable modular truck toolbox mounting lift system, this time, showing an alternate embodiment of the modular toolbox system, which includes tray system 990. As illustrated therein FIG. 6, compartment toolbox 900 has been substituted with tray system 990. Tray system 990 may similarly attach to driver side fixed length arm 101 and passenger side fixed length arm 102 via driver side arm pivot 112 and passenger side arm pivot 122, such that during extension of passenger side fixed length arm 102 and passenger side extending/retracting arm 202, tray system 990 remains substantially upright/horizontal. As may be observed by those having ordinary skill in the art, compartment toolbox 900 may serve various purposes, such as direct storage of tools and/or objects, or for storage/placement of modular units, as illustrated in FIGS. 7A-C.

Figure 7A:
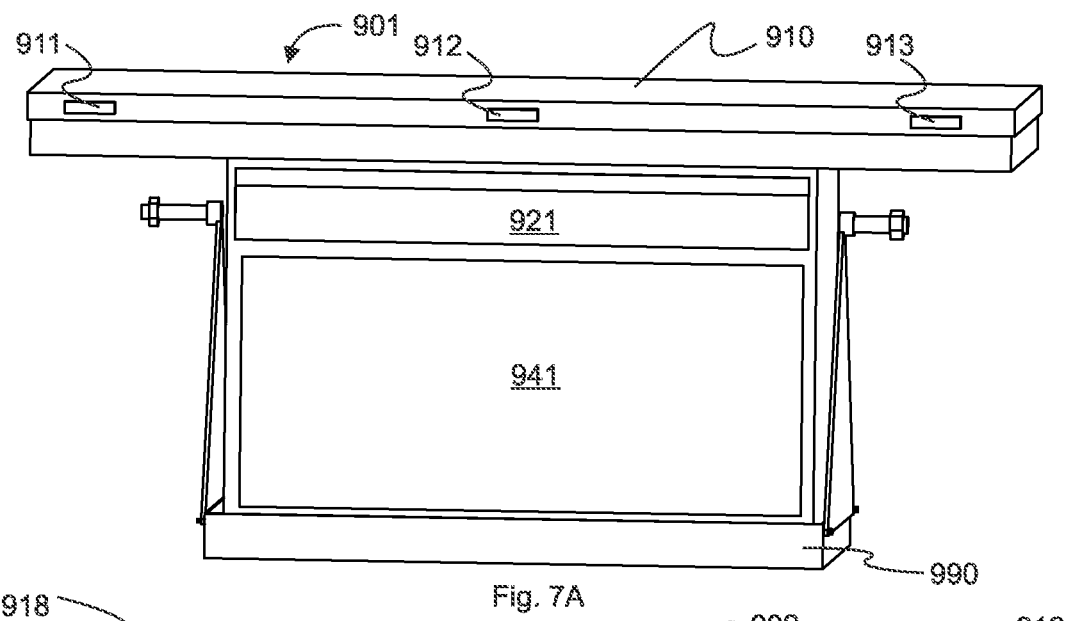
FIG. 7A is a perspective drawing of a first exemplary modular toolbox of the disclosure.
Figure 7B:
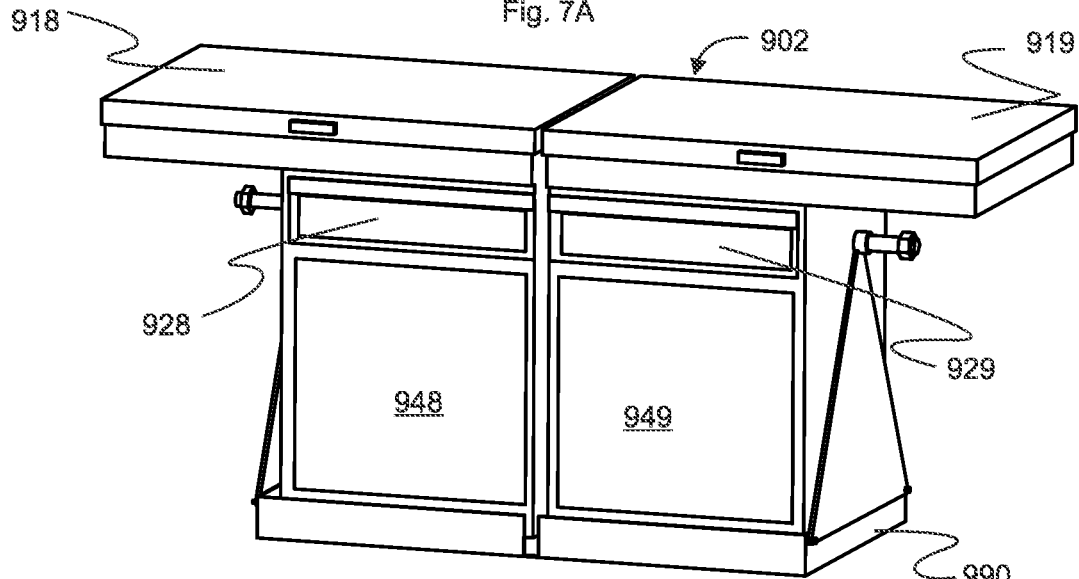
FIG. 7B is a perspective drawing of a second embodiment of the modular toolbox of the disclosure.
Figure 7C:
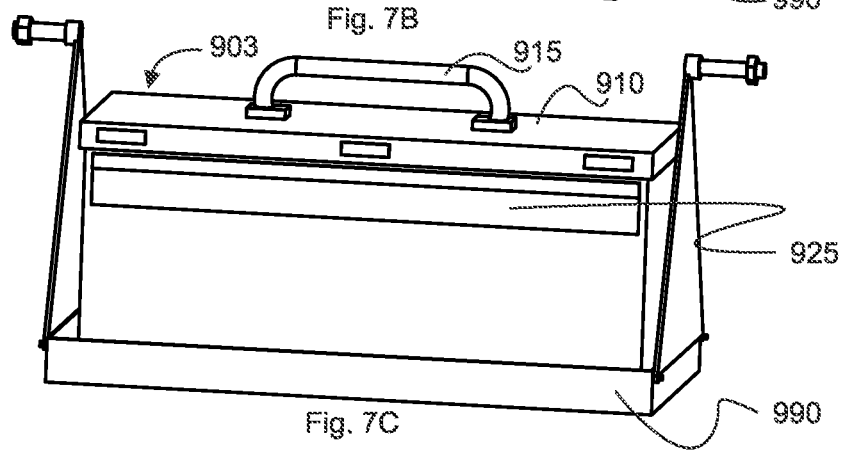
FIG. 7C is a perspective drawing of a third embodiment of the modular toolbox of the disclosure.

Referring to FIGS. 7A-C in combination, illustrated therein are various embodiments of the disclosed modular toolbox system, which may be used in conjunction with tray system 990 (as illustrated in FIG. 6), and various contemplated possibilities for its modular use. Starting with FIG. 7A, cabinet toolbox 901 may be illustrated therein. Cabinet toolbox 901 may most resemble compartment toolbox 900, but may be illustrated to work as a modular feature of tray system 990. It may feature, for instance, toolbox latches 911, 912, 913, toolbox lid 910, toolbox tray drawer 921, and toolbox deep drawer 941. Such features may be substituted with other common toolbox or utility cabinetry features as described above and known to those having ordinary skill in the art. Turning to FIG. 7B, divided toolbox 902 may be illustrated therein as a similar modular toolbox, but having a separation/modular feature such that two (or more) toolboxes may be separated and/or segmented to provide for easier disassembly and/or removal of divided toolbox 902. As understood by those having skill in the art, while only two segments are illustrated therein FIG. 7B, the disclosure is not so limited and may include 2 or more segments, and may be divided along the center as illustrated, or laterally from bed driver rail D to bed passenger rail P. Divided toolbox 902 may also feature various parts and compartments, such as driver side toolbox lid 918 and passenger side toolbox lid 919, which may offer more convenient access to the contents thereof from bed driver rail D or bed passenger rail P, without requiring movement of the movable modular truck toolbox mounting lift system. Further features may include driver side drawer tray 928, passenger side drawer tray 929, driver side deep drawer 948 and passenger side deep drawer 949, which may similarly offer such convenient access from either side without requiring the movement of the movable modular truck toolbox mounting lift system. As understood by those having skill in the art, each segment of divided toolbox 902 may be placed and removed from tray system 990 for further utility and convenience. Finally, turning to FIG. 7C, handle toolbox 903 is illustrated therein to include what may be a standard compartmentalized toolbox, which may or may not be specifically adapted for use with tray system 990. It may feature toolbox handle 915, toolbox lid 910, and toolbox accessory tray 925.

Figure 8:
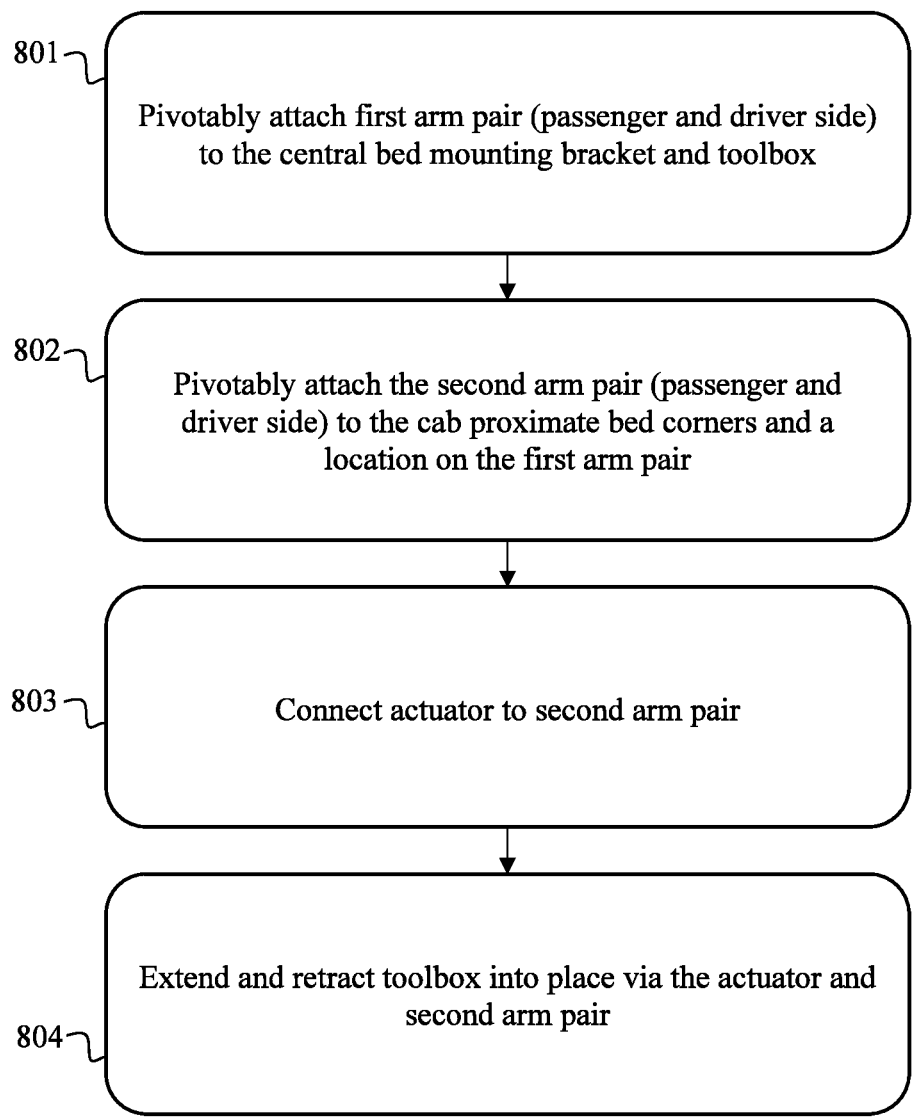
FIG. 8 is a flowchart of an exemplary method of the disclosure.

Referring to FIG. 8, illustrated therein is a flowchart of an exemplary movable modular truck toolbox mounting lift system method of use of the disclosure. Starting at first step 801, a first arm pair corresponding to driver side fixed length arm 101 and passenger side fixed length arm 102 may be installed centrally within the truck bed as described above in various embodiments (i.e., an attachment having pivoting capabilities). Also in first method step 801, driver side fixed length arm 101 and passenger side fixed length arm 102 may be installed thereon the modular accessory and/or compartment toolbox 900 (or the described variations thereof, e.g., tray system 990). Then, at second method step 802, driver side extending/retracting arm 201 and passenger side extending/retracting arm 202 may be similarly attached proximate each cab bed corner as illustrated and described herein, such that they may pivot about a connection to the bed and/or cab bracket(s) 303. Also at second method step 802, the second arm pair (driver side extending/retracting arm 201 and passenger side extending/retracting arm 202) may be further pivotably attached to the first arm pair between the existing connections to the bed (or central mounting brackets, e.g., driver side central bracket 301 and passenger side central bracket 302) and the modular accessory (e.g., compartment toolbox 900, tray system 990). At third method step 803, an actuator for powering and controlling the extension/contraction of driver side extending/retracting arm 201 and passenger side extending/retracting arm 202 may be installed as may be understood by those having ordinary skill in the art, in light of the disclosure. Finally, at fourth method step 804, an extension and/or retraction of driver side extending/retracting arm 201 and passenger side extending/retracting arm 202 may be caused to occur via various systems and methods as described herein to achieve the intended results as herein described. Those skilled in the art may further understand these method steps may be broken down into the steps of: (1) pivotably attaching driver side fixed length arm 101 and passenger side fixed length arm 102 to driver side central bracket 301 and passenger side central bracket 302, respectively; (2) pivotably attaching driver side fixed length arm 101 and passenger side fixed length arm 102 to the modular accessory (e.g., compartment toolbox 900, tray system 990); (3) pivotably attaching driver side extending/retracting arm 201 and passenger side extending/retracting arm 202 to cab bracket(s) 303; (4) further pivotably attaching driver side extending/retracting arm 201 and passenger side extending/retracting arm 202 to driver side fixed length arm 101 and passenger side fixed length arm 102 as described herein; (5) providing an actuator capable of extending and retracting driver side extending/retracting arm 201 and passenger side extending/retracting arm 202.

With respect to the above description then, it is to be realized that the optimum dimensional relationships, to include variations in size, materials, shape, form, position, function and manner of operation, assembly, type and structure of materials, shape, manner of assembly, and type of vehicle and use, are intended to be encompassed by the present disclosure.

It is contemplated herein, and should be realized by those having ordinary skill in the art, that the movable modular truck toolbox mounting lift system of the disclosure (and its methods of use) includes variations in size, shape, construction, manufacture, components, power source, assembly, the like and/or combinations thereof. The movable modular truck toolbox mounting lift system of the disclosure may be powered using onboard vehicle power, or may be powered internally through use of any known method of powering a device of the disclosure. While specific dimensions, shapes, angles, components, gears, chains, pumps, engines, bolts, stocks, motors, bearings, the like and/or combinations thereof of the disclosed movable modular truck toolbox mounting lift system may be specifically described herein, the disclosure is not so limited. The movable modular truck toolbox mounting lift system of the disclosure may be attached to a vehicle, transported or used among a plurality of vehicles, manufactured as original equipment by vehicle manufacturer(s), or it may be a standalone system used with or without a vehicle. While the machine may be used to lift the various objects disclosed herein, other uses of the machine may be understood by those skilled in the art and the disclosure is not so limited to include only the disclosed uses.

The foregoing description and drawings comprise illustrative embodiments of the present disclosure. Having thus described exemplary embodiments of the movable modular truck toolbox mounting lift system, it should be noted by those ordinarily skilled in the art that the within disclosures are exemplary only, and that various other alternatives, adaptations, and modifications of the movable modular truck toolbox mounting lift system may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A system for repositioning a toolbox from a cab proximate position to a tailgate proximate position of a vehicle storage area of a vehicle using a modular accessory, the vehicle storage area bordered by a passenger side, a driver side, a cab side, and a tailgate side, the system comprising:
the modular accessory having a lower portion which extends into the vehicle storage area and a platform capable of receiving the toolbox;
the toolbox having an upper lip portion configured to rest atop the passenger side and the driver side of the vehicle storage area when positioned atop the modular accessory, the toolbox is segmented having a passenger side segment and a driver side segment, the passenger side segment and the driver side segment are independently detachable from the modular accessory;
a fixed length driver side arm pivotably connected to a first driver side bracket therebetween the cab side and the tailgate side proximate the driver side, said fixed length driver side arm further pivotably connected to the modular accessory;
a fixed length passenger side arm pivotably connected to a first passenger side bracket therebetween the cab side and the tailgate side proximate the passenger side, said fixed length passenger side arm further pivotably connected to the modular accessory;
a hydraulic driver side arm pivotably connected to a second driver side bracket proximate the cab side and the driver side, said hydraulic driver side arm further pivotably connected to said fixed length driver side arm;
a hydraulic passenger side arm pivotably connected to a second passenger side bracket proximate the cab side and the passenger side, said hydraulic passenger side arm further pivotably connected to said fixed length passenger side arm; and
an actuator capable of extending and retracting said hydraulic driver side hydraulic arm and said hydraulic passenger side hydraulic arm;
wherein upon a simultaneous extension of said hydraulic driver side arm and said hydraulic passenger side arm, the modular accessory is relocated from the cab side to the tailgate side of the vehicle storage area and the modular accessory raises the toolbox over a payload of the vehicle storage area, said actuator is controlled by a remote device capable of controlling said actuator.

2. The system of claim 1, wherein the modular accessory is configured to receive the toolbox.

3. The system of claim 1, wherein the vehicle is a passenger truck and the storage area is a truck bed.

4. The system of claim 3, wherein said first driver side bracket is secured to the vehicle at a driver side wheel arch and said first passenger side bracket is secured to the vehicle at a passenger side wheel arch, said driver side wheel arch and said passenger side wheel arch are within said truck bed.

5. The system of claim 4, wherein said first driver side bracket and said first passenger side bracket are further secured to a bottom surface of said truck bed.

6. The system of claim 1, wherein said fixed length driver side arm and said fixed length passenger side arm are capable of pivoting in coordination with an extension and retraction of said hydraulic driver side arm and said hydraulic passenger side arm to stabilize said modular accessory while said modular accessory is raised to a height.

7. The system of claim 6, wherein the vehicle storage area contains a payload having a payload height, and said height exceeds said payload height.

8. The system of claim 7, wherein said payload is secured the vehicle storage area using a gravitational force provided by the modular accessory and the toolbox, the toolbox having a weight.

9. A method of enabling a repositioning of a toolbox from a cab proximate position to a tailgate proximate position of a vehicle storage area of a vehicle, the vehicle storage area bordered by a passenger side, a driver side, a cab side, and a tailgate side, the method comprising:
  providing a modular accessory, the modular accessory having a lower portion which extends into the vehicle storage area and the toolbox having an upper lip portion configured to rest atop the passenger side and the driver side of the vehicle storage area;
  providing the toolbox, the toolbox is segmented having a passenger side segment and a driver side segment, the passenger side segment and the driver side segment are independently detachable from the modular accessory;
  pivotably attaching a fixed length driver side arm to a first driver side bracket therebetween the cab side and the tailgate side proximate the driver side;
  pivotably attaching said fixed length driver side arm to the modular accessory;
  pivotably attaching a fixed length passenger side arm to a first passenger side bracket therebetween the cab side and the tailgate side proximate the passenger side;
  pivotably attaching said fixed length passenger side arm to the modular accessory;
  pivotably attaching a hydraulic driver side arm to a second driver side bracket proximate the cab side and the driver side;
  pivotably attaching said hydraulic driver side arm to said fixed length driver side arm;
  pivotably attaching a hydraulic passenger side arm to a second passenger side bracket proximate the cab side and the passenger side;
  pivotably attaching said hydraulic passenger side arm to said fixed length passenger side arm; and
  providing an actuator capable of extending and retracting said hydraulic driver side arm and said hydraulic passenger side arm.

10. The method of claim 9, wherein during an extension of said hydraulic driver side arm and said hydraulic passenger side arm, the modular accessory raises over a payload of the vehicle storage area.

11. The method of claim 9, further comprising the step of extending said hydraulic driver side arm and said hydraulic passenger side arm simultaneously via said actuator.

12. The method of claim 11, wherein the actuator is controlled via a remote device capable of activating said actuator, further comprising the steps of raising and moving the modular accessory from the cab proximate position to the tailgate proximate position.

13. The method of claim 9, wherein the vehicle is a passenger truck and the vehicle storage area is a truck bed.

14. The method of claim 13, further comprising a step of securing a payload to the vehicle storage area using a gravitational force provided by the modular accessory and the toolbox, the toolbox having a weight.

15. The method of claim 9, further comprising the step of securing said first driver side bracket to the vehicle at a driver side wheel arch and the step of securing said first passenger side bracket to the vehicle at a passenger side wheel arch.

16. The method of claim 15, further comprising the step of further securing said first driver side bracket and said first passenger side bracket to a bottom surface of said vehicle storage area.

* * * * *